US011433543B2

(12) United States Patent
Toyoda et al.

(10) Patent No.: US 11,433,543 B2
(45) Date of Patent: Sep. 6, 2022

(54) CALIBRATION METHOD FOR OPERATION APPARATUS, OPERATION APPARATUS SYSTEM, AND CONTROL APPARATUS

(71) Applicant: HIRATA CORPORATION, Kumamoto (JP)

(72) Inventors: Kazutaka Toyoda, Kumamoto (JP); Yutaro Maruno, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 17/078,209

(22) Filed: Oct. 23, 2020

(65) Prior Publication Data
US 2021/0039260 A1 Feb. 11, 2021

Related U.S. Application Data

(63) Continuation of application No. PCT/JP2019/025516, filed on Jun. 27, 2019.

(30) Foreign Application Priority Data

Aug. 30, 2018 (JP) .............................. JP2018-162072

(51) Int. Cl.
*B25J 9/16* (2006.01)
*B25J 13/08* (2006.01)
*B25J 9/12* (2006.01)

(52) U.S. Cl.
CPC ........... *B25J 9/1692* (2013.01); *B25J 13/087* (2013.01); *B25J 9/12* (2013.01)

(58) Field of Classification Search
CPC ... B25J 9/046; B25J 9/12; B25J 9/1602; B25J 9/1653; B25J 9/1674; B25J 9/1692;
(Continued)

(56) References Cited

U.S. PATENT DOCUMENTS 5,239,855 A * 8/1993 Schleifer ................ B25J 9/1692
73/1.75
2013/0238126 A1 9/2013 Ohta et al.

FOREIGN PATENT DOCUMENTS

EP 0522411 A1 1/1993
JP S62148173 A 7/1987
(Continued)

OTHER PUBLICATIONS

International Search Report (PCT/ISA/210) dated Oct. 1, 2019, by the Japan Patent Office as the International Searching Authority for International Application No. PCT/JP2019/025516.
(Continued)

*Primary Examiner* — Dale Moyer
(74) *Attorney, Agent, or Firm* — Buchanan Ingersoll & Rooney PC

(57) ABSTRACT

There is provided for a calibration method for an operation apparatus. The operation apparatus comprises a first moving body unit capable of pivoting about a horizontally extending axis, a first driving unit configured to drive the first moving body unit, and a first detection unit configured to detect a pivot position of the first moving body unit. The method comprises aligning the first moving body unit to one reference position selected from a plurality of predetermined reference positions, determining the reference position by comparing a driving parameter value of the first driving unit at the one reference position with determination parameter values respectively preset for the plurality of reference positions, and registering, as reference position information for calculating the pivot position, position information of the one reference position determined in the determining and detection value information of the first detection unit.

14 Claims, 12 Drawing Sheets

(58) Field of Classification Search
CPC ......... B25J 13/087; G05B 2219/39018; G05B 2219/39023; G05B 2219/39024; G05B 2219/39027; G05B 2219/39049; G05B 2219/39051
See application file for complete search history.

(56) References Cited

FOREIGN PATENT DOCUMENTS

| | | |
|---|---|---|
| JP | S62297082 A | 12/1987 |
| JP | H05-216514 A | 8/1993 |
| JP | H08281582 A | 10/1996 |
| JP | 2003220587 A | 8/2003 |
| JP | 2005028529 A | 2/2005 |
| JP | 2013-184235 A | 9/2013 |

OTHER PUBLICATIONS

Written Opinion (PCT/ISA/237) dated Oct. 1, 2019, by the Japan Patent Office as the International Searching Authority for International Application No. PCT/JP2019/025516.

Extended European Search Report dated Jun. 24, 2021, issued in corresponding European Application No. 19853639 3. (12 pages).

Donghai Ma, "Autonomous Torque Sensor Calibration and Gravity Compensation for Robot Manipulators", Nov. 30, 1995, pp. 1-85, XP055812846, Retrieved from the Internet: URL:https://central.bac-lac.gc.ca/.item?id =TC-QMM-23748&op=pdf&app= Library &oclc_number=897940079.

Office Action dated Mar. 31, 2022, by the Korean Patent Office in corresponding Korean Patent Application No. 10-2020-7033583 and partial machine English translation of the Office Action. (6 pages).

* cited by examiner

F I G. 7

| SHAFT INFORMATION | DETERMINATION ANGLE INFORMATION (DEGREES) | ANOTHER MOVING BODY UNIT HOLDING POSITION (DEGREE) | CURRENT LOWER LIMIT VALUE INFORMATION (mA) | CURRENT UPPER LIMIT VALUE INFORMATION (mA) |
|---|---|---|---|---|
| J1 | 0 | 0 | a1 | a1+α1 |
| J1 | 0 | 90 | a1' | a1'+α1' |
| J1 | 90 | 0 | ... | ... |
| J1 | 90 | 90 | ... | ... |
| J2 | 0 | ... | ... | ... |
| ... | | | | |

M7a

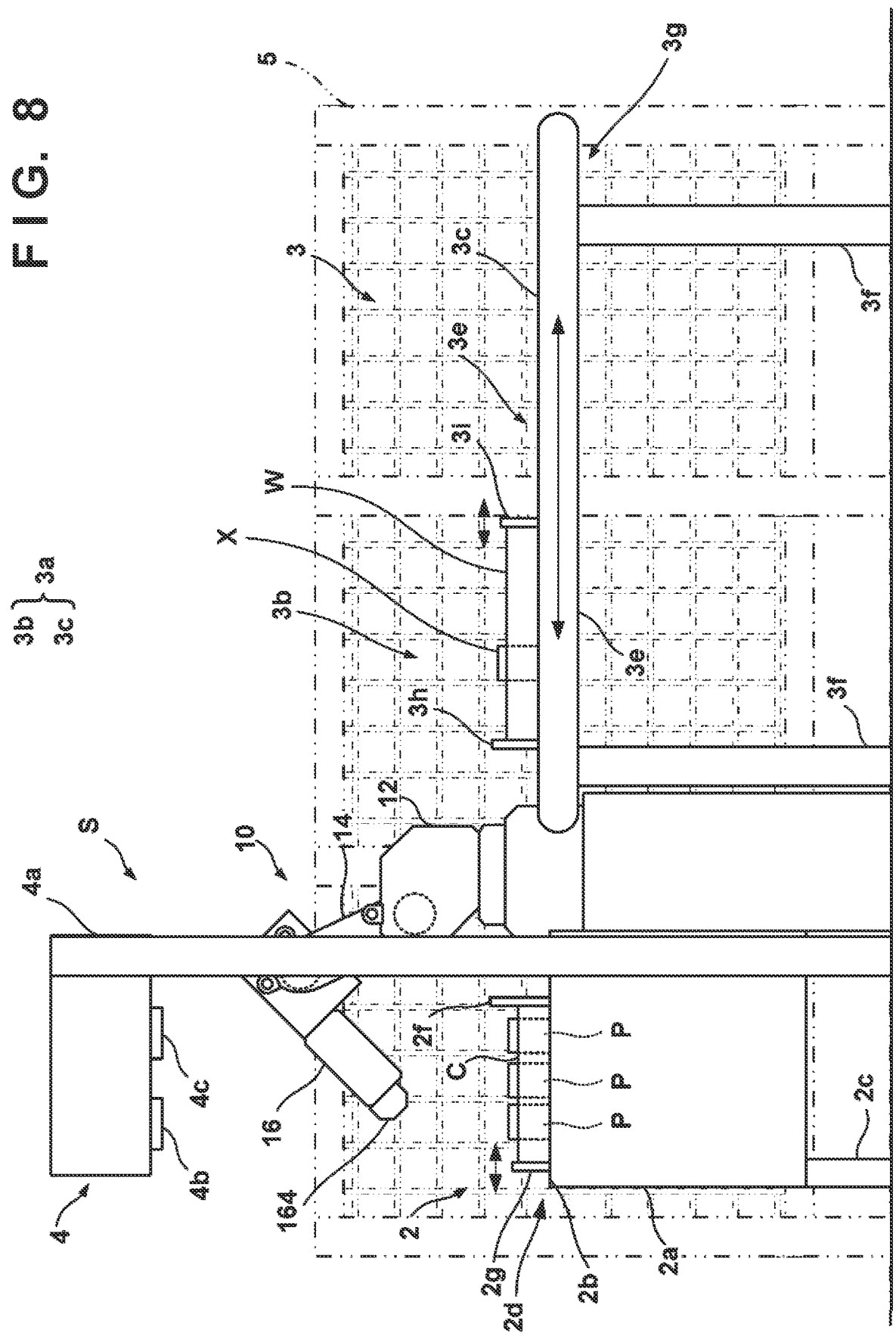

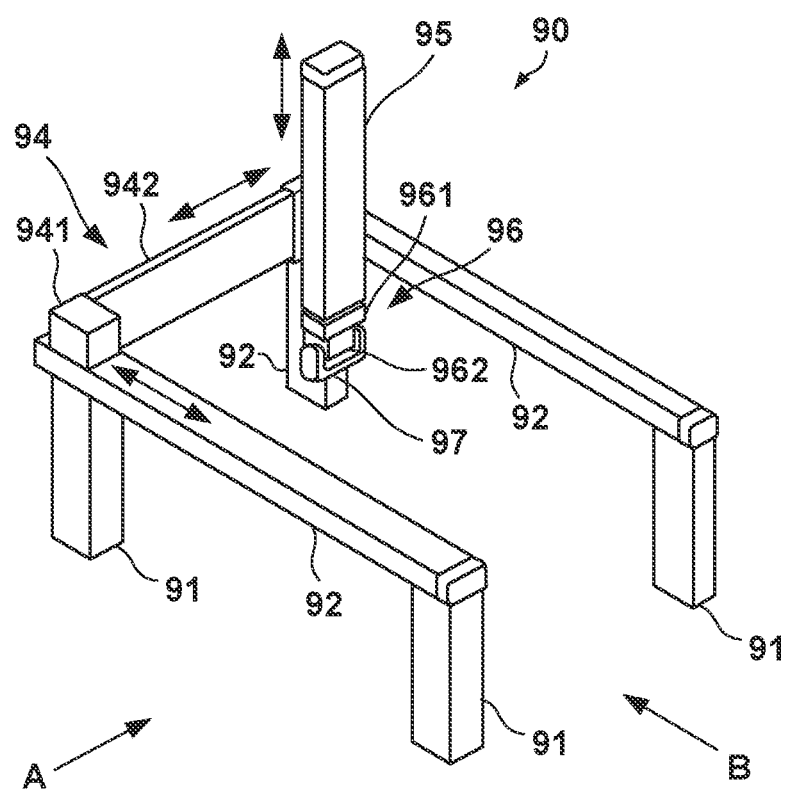
F I G. 9A

CALIBRATION METHOD FOR OPERATION APPARATUS, OPERATION APPARATUS SYSTEM, AND CONTROL APPARATUS

CROSS-REFERENCE TO RELATED APPLICATION(S)

This application is a continuation of International Patent Application No. PCT/JP2019/025516 filed on Jun. 27, 2019, which claims priority to and the benefit of Japanese Patent Application No. 2018-162072 filed on Aug. 30, 2018, the entire disclosures of which are incorporated herein by reference.

BACKGROUND OF THE INVENTION

Field of the Invention

The present invention relates to a calibration method for an operation apparatus, an operation apparatus system, and a control apparatus.

Description of the Related Art

Generally when setting the work position of an operation apparatus such as an industrial robot, alignment (calibration) of a reference position serving as the reference of the work position is performed in advance on the operation apparatus. Japanese Patent Laid-Open No. 2003-220587 describes a method of performing calibration using a plurality of distance sensors. Japanese Patent Laid-Open No. 62-297082 describes an industrial robot in which one of reference positions different in rotation angle set around a vertically extending axis is selected as the position of an operation apparatus, a calibration jig is mounted on the operation apparatus located at the selected reference position, and calibration is performed.

SUMMARY OF THE INVENTION

According to the present invention, there is provided a calibration method for an operation apparatus including a first moving body unit capable of pivoting about a horizontally extending axis, a first driving unit configured to drive the first moving body unit, and a first detection unit configured to detect a pivot position of the first moving body unit, the calibration method including: aligning the first moving body unit to one reference position selected from a plurality of predetermined reference positions; determining the reference position by comparing a driving parameter value of the first driving unit at the one reference position with determination parameter values respectively preset for the plurality of reference positions; and registering, as reference position information for calculating the pivot position, position information of the one reference position determined in the determining and detection value information of the first detection unit.

Further features of the present invention will become apparent from the following description of exemplary embodiments (with reference to the attached drawings).

BRIEF DESCRIPTION OF THE DRAWINGS

FIG. 7 is a table showing determination parameter information according to another embodiment;

FIG. 8 is a view showing an example in which an operation apparatus system is arranged in a work system S configured to perform predetermined work;

FIG. 9A is a view schematically showing an operation apparatus according to another embodiment;

DESCRIPTION OF THE EMBODIMENTS

Figure 1:
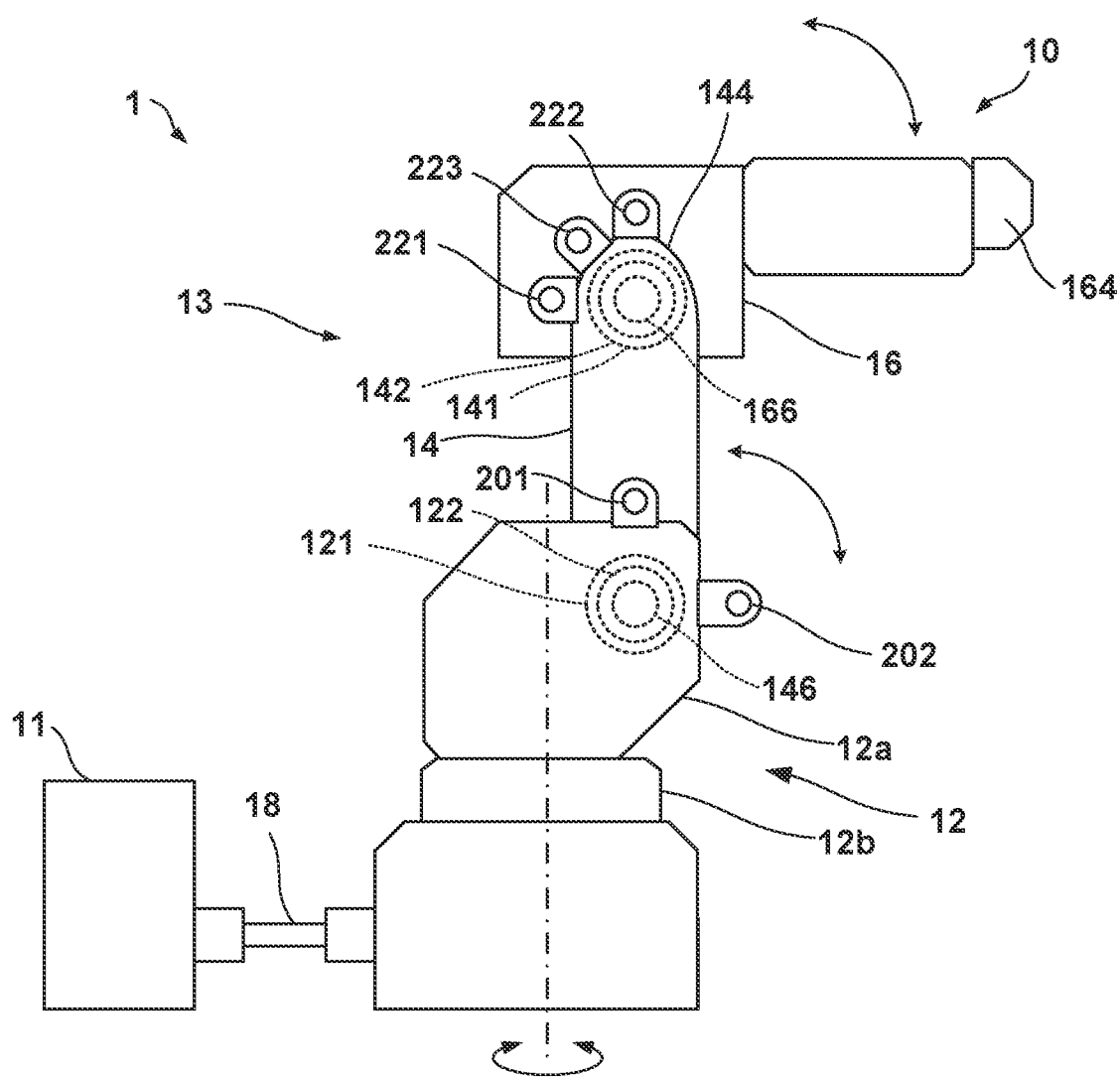
FIG. 1 is a side view schematically showing an operation apparatus system according to an embodiment.

In a work system that performs predetermined work using a plurality of apparatuses and the like, calibration is sometimes performed after an operation apparatus is installed in a factory together with the plurality of apparatuses. When performing calibration under this condition, the operation apparatus and surrounding obstacles such as peripheral apparatuses (plurality of apparatuses) and safety fences set around the operation apparatus need to be so positioned as not to interfere with each other. However, in Japanese Patent Laid-Open No. 2003-220587, only one posture (reference position) in which calibration can be executed is set. The peripheral apparatuses and the like need to be arranged at positions where they do not interfere with the operation apparatus positioned in this posture. This restricts the arrangement of the peripheral apparatuses and the like. In Japanese Patent Laid-Open No. 62-297082, an arbitrary position where no interference occurs can be selected from a plurality of reference positions and calibration can be performed. However, when an operator inputs information of the selected position, an input error caused by a human error may occur.

An embodiment of the present invention provides a calibration method capable of preventing interference between an operation apparatus and peripheral apparatuses and the like, and avoiding generation of an input error of reference position information.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted. Note that up, down, right, and left directions with respect to the drawing are defined as up, down, right, and left directions of an apparatus or member in the embodiment and will be used in the description of the specification.

FIG. 1 is a side view schematically showing an operation apparatus system according to the embodiment. An operation apparatus system 1 includes an operation apparatus 10, and a control apparatus 11 that controls the operation apparatus 10. In the embodiment, the operation apparatus 10 is a vertical articulated robot.

<Outline of Operation Apparatus>

The operation apparatus 10 includes a base 12 and a moving body unit 13. The moving body unit 13 is provided pivotally about a horizontally extending axis with respect to the base 12. In the embodiment, the operation apparatus 10 is a vertical articulated robot including, as the moving body unit 13, an upper arm 14 pivotally supported by the base 12, and a forearm 16 pivotally supported by the upper arm 14. The embodiment exemplifies the structure of the moving body unit 13 in which the forearm 16 is supported by the upper arm 14 supported by the base 12 and the two moving body units are series-connected. However, the present invention can also adopt a structure having only the upper arm 14 or a structure in which three or more moving body units are series-connected. The present invention can also adopt a structure in which a plurality of moving body units are parallel-supported by the base 12, or a combination of these structures.

The base 12 is provided at rest at an installation place and electrically connected to the control apparatus 11 via a connecting portion 18. The base 12 includes a driving unit 121 for pivoting the upper arm 14, and a detection unit 122 for detecting the pivot position of the driving unit 121. In the embodiment, the driving unit 121 is a numerically controllable motor, and the detection unit 122 is an encoder. In the embodiment, the encoder is an absolute encoder capable of detecting the rotation angle of the motor as an absolute value. From the detection result of the encoder, the position (posture) of the upper arm 14 with respect to the base 12 can be determined.

Note that the embodiment employs a servo motor in which the driving unit 121 and the detection unit 122 are integrated, but may employ an arrangement in which the driving unit 121 and the detection unit 122 are separate.

In the embodiment, the base 12 is provided at rest at an installation place. However, the present invention can also adopt, for example, an arrangement in which the base 12 includes a base main body 12b resting at an installation place and a base turn portion 12a capable of turning about an vertically extending axis with respect to the base main body 12b, and the base turn portion 12a can be turned by a motor (not shown) or the like.

Figure 2:
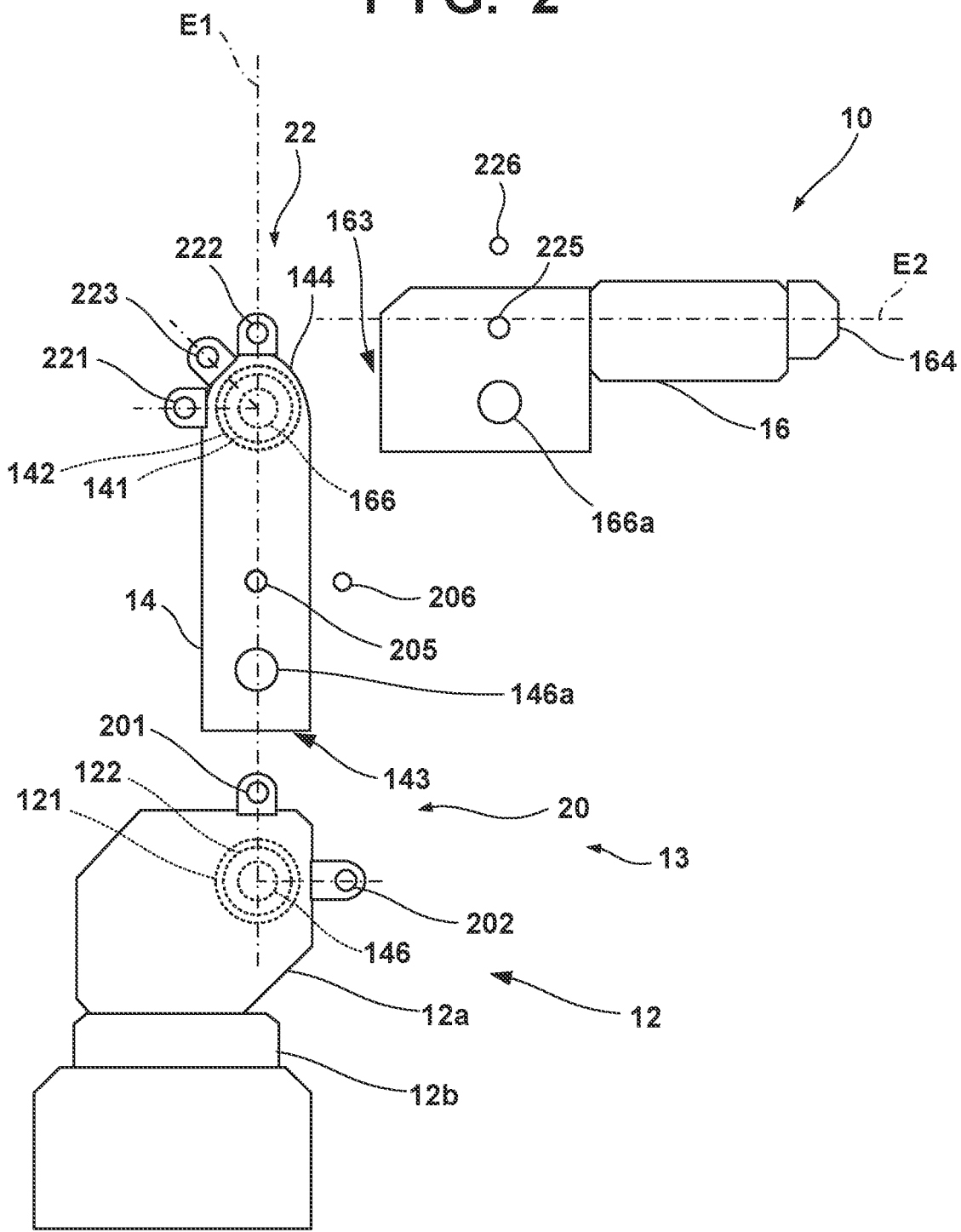
FIG. 2 is an exploded side view of the operation apparatus.

FIG. 2 is referred to together with FIG. 1. FIG. 2 is an exploded side view schematically showing the operation apparatus. In the upper arm 14, a support portion 146a provided at one end 143 in a longitudinal direction E1 is axially supported to be pivotal by the base 12, and the forearm 16 is axially supported to be pivotal at the other end 144. The other end 144 and the one end 143 are spaced apart by a predetermined distance, and the other end 144 moves on a circumferential track about the pivot shaft of a pivot shaft member 146 of the upper arm 14. The upper arm 14 includes a driving unit 141 for driving the forearm 16, and a detection unit 142.

In the embodiment, the driving unit 141 is a motor, and the detection unit 142 is an encoder. In the embodiment, the encoder is an absolute encoder capable of detecting the rotation angle of the motor as an absolute value. From the detection result of the encoder, the position (posture) of the forearm 16 with respect to the upper arm 14 can be determined. The upper arm 14 has a positioning hole 205 (to be described later) near the support portion 146a. Note that the embodiment adopts a servo motor in which the driving unit 141 and the detection unit 142 are integrated, but may employ another arrangement similar to the above-described driving unit 121 and detection unit 122, for example, an arrangement in which the driving unit 141 and the detection unit 142 are separate.

In the forearm 16, a support portion 166a provided at one end 163 in a longitudinal direction E2 is axially supported to be pivotal by the upper arm 14. The forearm 16 has a positioning hole 225 (to be described later) near the support portion 166a. A tip 164 serving as the other end and the one end 163 are spaced apart by a predetermined distance, and the tip 164 moves on a circumferential track about a pivot shaft member 166 of the forearm 16. Various tip tools can be attached to the tip 164. The tip tools may have, for example, a mechanism of gripping a target work, and a mechanism of performing machining such as drilling on a target work. The tip tools can be changed in accordance with work.

<Arrangement of Alignment Mechanism>

Alignment mechanisms 20 and 22 according to the embodiment will be described. In the following description, the base 12 when performing alignment of the upper arm 14, and the upper arm 14 when performing alignment of the forearm 16 will be sometimes called stationary body sides. The upper arm 14 when performing alignment of the upper arm 14, and the forearm 16 when performing alignment of the forearm 16 will be sometimes called moving body sides. In calibration according to the embodiment, the pivot angle of the moving body side with respect to the stationary body side at one selected reference position, and the detection results of the detection units 122 and 142 are registered in a storage unit 112 (to be described later) in association with each other.

The alignment mechanism 20 is a mechanism for, when performing calibration of the detection unit 122, aligning the position of the upper arm 14 (moving body side) with respect to one reference position selected from a plurality of reference positions set at different angles about the pivot shaft of the pivot shaft member 146 of the base 12 (stationary body side). In the embodiment, the alignment mechanism 20 includes reference holes 201 and 202 provided on the base 12 side, and the positioning hole 205 provided on the upper arm 14 side. The reference holes 201 and 202 are holes formed in bracket members respectively provided at the outer edge of the base turn portion 12a. When performing alignment, the operator operates to pivot the upper arm 14 and align the positioning hole 205 so that the positioning hole 205 overlaps either the reference hole 201 or 202 (make the centers of the respective holes coincide with each other). Then, the alignment of the pivot angle of the upper arm 14 with respect to the base 12 is checked. Note that the alignment mechanism 20 may adopt an arrangement further including a positioning member. For example, the positioning member may be a pin member, and the operator may insert the pin member into either the reference hole 201 or 202 and the positioning hole 205, and check the alignment of the pivot angle of the upper arm 14 with respect to the base 12.

The reference hole 201 is provided at a distance from the pivot shaft center of the pivot shaft member 146 on the first line extending in the first direction in the radial direction. The reference hole 202 is provided at a distance from the pivot shaft center of the pivot shaft member 146 on the second line extending in the second direction in the radial direction that is different from the first direction by 90° in phase. In the embodiment, the first direction is a vertical direction. By aligning the reference hole 201 and the positioning hole 205, the upper arm 14 can be adjusted to a position (to be sometimes referred to as a vertical position) where the longitudinal direction E1 of the upper arm 14 coincides with the vertical direction. Also, the second direction is a horizontal direction. By aligning the reference hole 202 and the positioning hole 205, the upper arm 14 can be adjusted to a position (to be sometimes referred to as a horizontal position) where the longitudinal direction E1 of the upper arm 14 coincides with the horizontal direction.

The alignment mechanism 22 is a mechanism for, when performing calibration of the detection unit 142, aligning the position of the forearm 16 (moving body side) with respect to one reference position selected from a plurality of reference positions set at different angles about the pivot shaft of the pivot shaft member 166 for the upper arm 14 (stationary body side). In the embodiment, the alignment mechanism 22 includes reference holes 221, 222, and 223 provided on the upper arm 14 side, and the positioning hole 225 provided on the forearm 16 side. The reference holes 221, 222, and 223 are holes formed in bracket members respectively provided at the outer edge of the other end 144 of the upper arm 14. When performing alignment, the operator operates to pivot the forearm 16 and align the positioning hole 225 so that the positioning hole 225 overlaps one of the reference holes 221, 222, and 223 (make the centers of the respective holes coincide with each other). Then, the alignment of the pivot angle of the forearm 16 with respect to the upper arm 14 is checked. Note that the alignment mechanism 22 may adopt an arrangement further including a positioning member. For example, the positioning member may be a pin member, and the operator may insert the pin member into one of the reference holes 221, 222, and 223 and the positioning hole 225 and check the alignment of the pivot angle of the forearm 16 with respect to the upper arm 14.

The reference hole 222 is provided at a distance from the pivot shaft center of the pivot shaft member 166 on a line extending in the first direction in the radial direction. The reference hole 221 is provided at a distance from the pivot shaft center of the pivot shaft member 166 on a line extending in the second direction in the radial direction that is different from the first direction by 90° in phase. The reference hole 223 is provided between the first and second directions, and is provided at a distance from the pivot shaft center of the pivot shaft member 166 on a line extending in the third direction in the radial direction that is different from the first direction by 45° in phase. In the embodiment, the second direction is a horizontal direction. By aligning the reference hole 221 and the positioning hole 225, a line extending from the center of the support 166a to the positioning hole 225 coincides with a line extending from the pivot shaft center of the pivot shaft member 166 to the reference hole 221. When the upper arm 14 is at the vertical position, the longitudinal direction E2 of the forearm 16 can be adjusted to an upward vertical position in the vertical direction.

Also, the first direction is a vertical direction. By aligning the reference hole 222 and the positioning hole 225, a line extending from the center of the support 166a to the positioning hole 225 coincides with a line extending from the pivot shaft center of the pivot shaft member 166 to the reference hole 222. When the upper arm 14 is at the vertical position, the longitudinal direction E2 of the forearm 16 can be adjusted to a horizontal position in the horizontal direction.

Further, the third direction is a 45° oblique direction. By aligning the reference hole 223 and the positioning hole 225, a line extending from the center of the support 166a to the positioning hole 225 coincides with a line extending from the pivot shaft center of the pivot shaft member 166 to the reference hole 223. When the upper arm 14 is at the vertical position, the longitudinal direction E2 of the forearm 16 can be adjusted to a position inclined upwardly by 45° obliquely from the horizontal direction. In other words, the inclined position is a position inclined downwardly by 45° from the vertical direction or a position inclined upwardly by 45° from the horizontal direction.

In the embodiment, the alignment mechanisms 20 and 22 perform alignment using the reference holes 201, 202, 221, 222, and 223 and the positioning holes 205 and 225, the operator inserts positioning members 206 and 226 into the aligned holes, and the positions are mechanically checked. However, the embodiment may adopt another arrangement. For example, at the time of alignment, a predetermined point on the stationary body side and a predetermined point on the moving body side may be set as alignment points, a predetermined distance between the points may be set as an alignment reference distance, and it may be determined using a distance sensor capable of measuring the distance whether the moving body side is at the reference position with respect to the stationary body side. Alternatively, for example, posture positions on the stationary body side and the moving body side at a plurality of reference positions may be set as reference positions using an image capturing device such as a camera, and it may be determined whether a posture at a position is the same as a posture at any one of the set reference positions. When the distance sensor or the image capturing device is used, the control apparatus 11 may automatically pivot and align the moving body side without pivoting the moving body side by the operator.

Figure 3A:
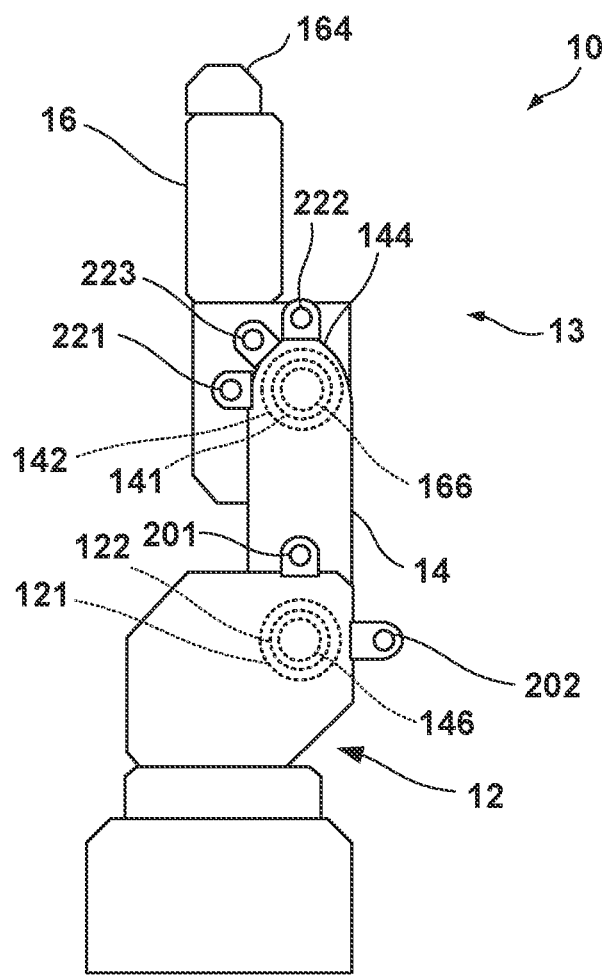
FIG. 3A is a side view showing an example of a calibration posture when there is no obstacle or the like on the periphery.
Figure 3B:
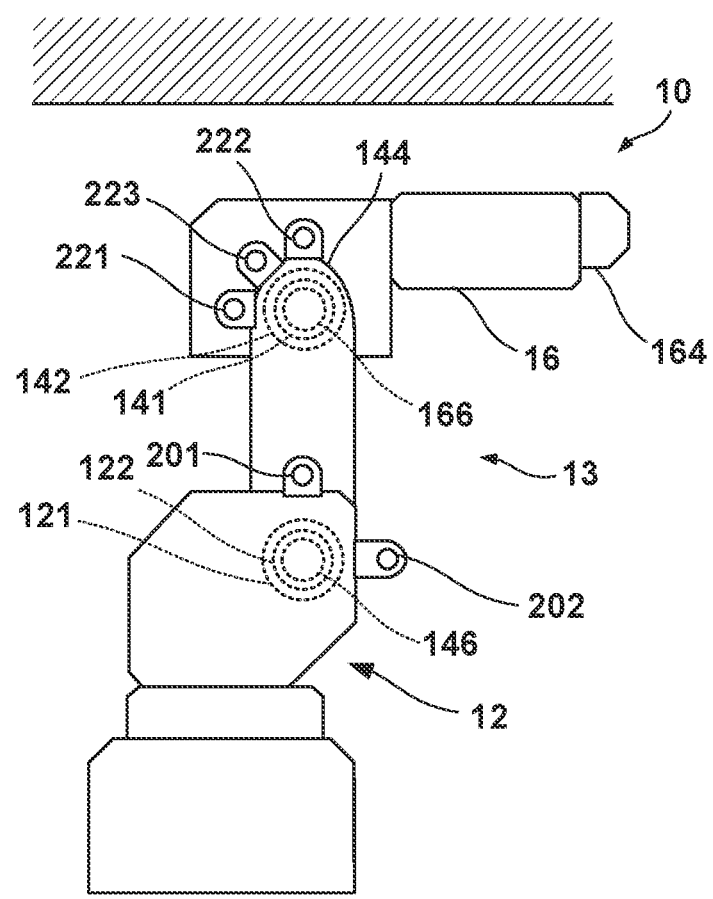
FIG. 3B is a side view showing an example of a calibration posture when there is an obstacle or the like on the periphery.
Figure 3C:
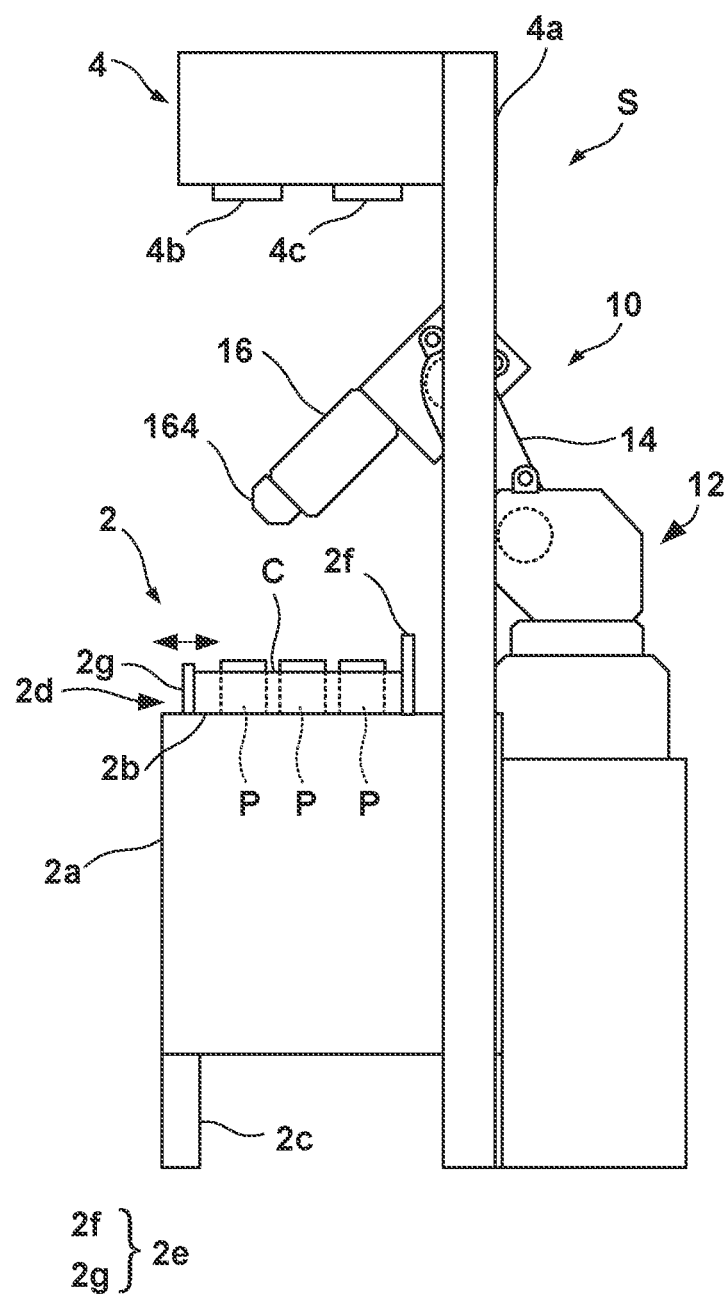
FIG. 3C is a view showing a work system including the operation apparatus.

FIGS. 3A to 3C are views showing an example of a posture at the time of calibration and a work system S including the operation apparatus 10. When there is no obstacle such as a peripheral apparatus or a safety fence around the operation apparatus 10, calibration can be performed in, for example, a state in which the upper arm 14 and the forearm 16 are at the vertical positions, as shown in FIG. 3A. When there is an obstacle above the operation apparatus 10, as shown in FIG. 3B, both the upper arm 14 and the forearm 16 cannot be located at the vertical positions, but only the forearm 16 is located at a horizontal position and calibration can be performed without interfering with the obstacle or the like. In this manner, the postures of the upper arm 14 and forearm 16 can be selected from a plurality of postures to perform alignment. For example, an identification unit 4 (to be described later) and the like are arranged above the operation apparatus 10 in the work system S, as shown in FIG. 3C, so no calibration can be performed in a state in which the upper arm 14 and the forearm 16 are at the vertical positions, as shown in FIG. 3A. In this case, calibration is performed in, for example, the posture in FIG. 3B.

FIG. 8 is referred to together with FIG. 3C. FIG. 8 is a view showing an example in which the operation apparatus 10 of the operation apparatus system 1 is arranged in the work system S configured to perform predetermined work. For descriptive convenience, FIG. 8 shows a state in which safety fences 5 positioned on a near side with respect to the operation apparatus 10 are removed. The work system S is installed at a predetermined position in a factory. The work system S identifies parts P stored in a container C, takes out the part P out from the container C by the operation apparatus 10 based on part information of the identified part P, and attaches the part P to a predetermined position X of a product W waiting in a work section 3 (to be described later).

The work system S includes a supply section 2 to which the part P is supplied, the work section 3 in which the product W waits and the part P is attached, and the identification unit 4 that identifies the part P supplied to the supply section 2. A working area for the operation apparatus 10 includes the operation ranges of the supply section 2, work section 3, and operation apparatus 10. In the work system S, the safety fences 5 are arranged respectively on facing sides between the working area and its outsides. The container C is loaded/unloaded into/from the supply section 2 on one (left in FIG. 8) of other sides of the work system S, and the product W is loaded/unloaded into/from the work section 3 on the other one (right in FIG. 8) of other sides.

The supply section 2 includes a mounting table 2a provided on one side of the work system S and including a mounting portion 2b on which the container C is mounted, and a mounting support portion 2c that positions the mounting portion 2b at a position of a predetermined height, and a part mounting unit 2d including a mounting positioning mechanism 2e that positions and holds the container C at a predetermined position of the mounting portion 2b, and a driving mechanism (actuator) (not shown) that operates the mounting positioning mechanism 2e.

As the mounting positioning mechanism 2e, a general mechanism can be employed. For example, the mounting positioning mechanism 2e includes a mounting reference member 2f with which one end of the container C is brought into contact, a mounting defining member 2g with which the other end of the container C is brought into contact, and a moving mechanism (not shown) that reciprocates the mounting defining member 2g with respect to the mounting reference member 2f By driving an actuator (not shown) in the moving mechanism, the mounting defining member 2g pushes the container C toward the mounting reference member 2f to position and hold the container C.

The container C is changed by a transfer apparatus (not shown) or an operator.

The work section 3 includes a work mounting unit 3a including a product positioning mechanism 3b that positions and holds the product W transferred to a work position, a driving mechanism (not shown) that operates the product positioning mechanism 3b, and a product transfer mechanism 3c that transfers the product W, and a working table 3g provided on the other side of the work system S and including a work setting portion 3e at which a work mounting unit 3d is set, and work support portions 3f that position the work setting portion 3e at a position of a predetermined height. As the product transfer mechanism 3c, a conveyor including an endless moving member (for example, belt) and a driving mechanism that operates the moving member is employed.

As the product positioning mechanism 3b, a general mechanism can be employed. For example, the product positioning mechanism 3b includes a work reference member 3h with which part of the product W is brought into contact, and a moving mechanism (not shown) that can reciprocate a product defining member 3i to move apart from or close to the work reference member 3h. By driving an actuator (not shown) in the moving mechanism, the product defining member 3i pushes the product W toward the work reference member 3h to position and hold the product W.

The identification unit 4 is supported by an identification support member 4a and arranged at a predetermined position spaced apart above the mounting portion 2b of the supply section 2. The identification unit 4 includes an image capturing unit 4b that captures the part P contained in the container C positioned and held by the mounting portion 2b of the supply section 2, an illumination unit 4c that emits light necessary for image capturing, an image processing unit (not shown) that numerically processes image information obtained by image capturing by the image capturing unit 4b, and a communication unit (not shown) that communicates with an external device. The identification unit 4 includes a registration unit (not shown) in which reference image information serving as reference information of the part P is registered, and a determination unit (not shown) that compares obtained image information having undergone image processing with reference image information and determines the type of the obtained part P. The information of the part P obtained by the identification unit 4 also includes position information and posture information of the obtained part P in the container C.

The safety fences 5 are provided from the supply section 2 and the operation apparatus 10 to the work section 3, and arranged respectively on facing sides of the work system S.

The work system S includes a system control unit (host computer 42) (not shown) that controls the work mounting unit 3a, the part mounting unit 2d, and the identification unit 4. The system control unit also manages the operation of the operation apparatus 10 based on information of the product W positioned and held by the work section 3 and information of the part P contained in the container C positioned and held by the supply section 2, and controls and manages the whole work system S.

<Control Apparatus>

Figure 4:
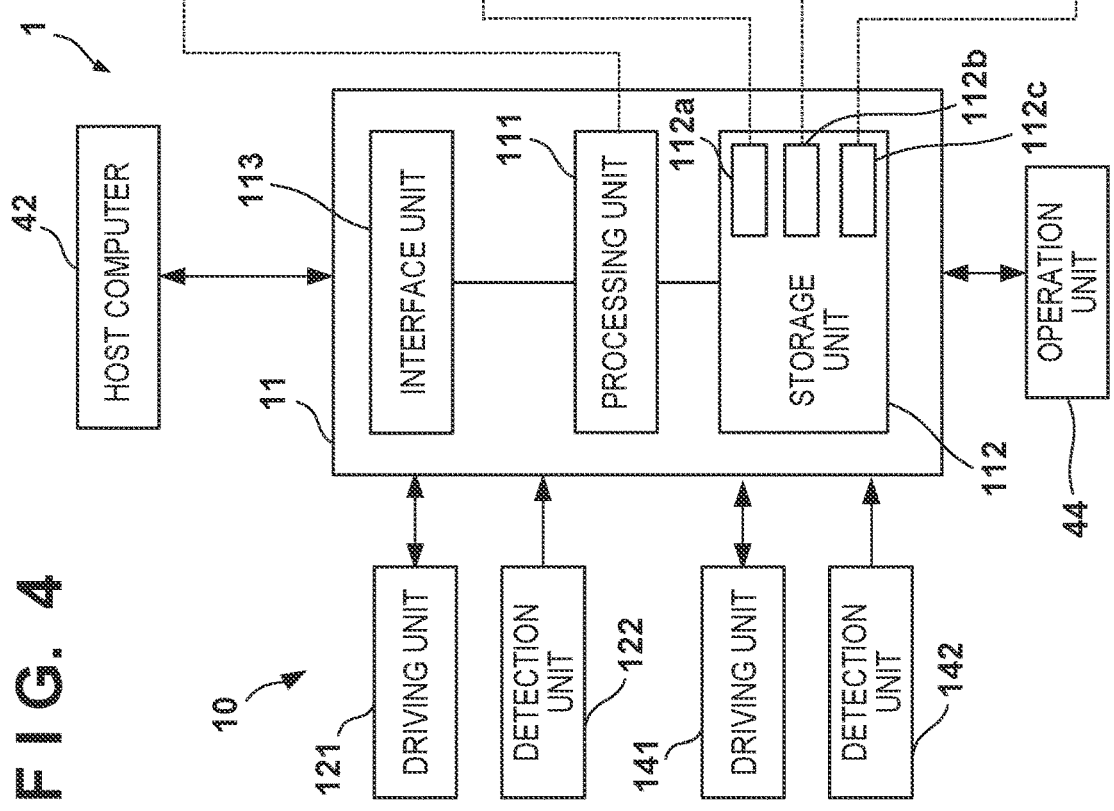
FIG. 4 is a block diagram of a control apparatus and is a diagram showing an arrangement regarding calibration.

Next, the arrangement of the control apparatus 11 will be described with reference to FIG. 4. FIG. 4 is a block diagram showing the control arrangement of the control apparatus 11, and is a diagram especially showing an arrangement regarding calibration of the detection units 122 and 142. The control apparatus 11 includes a processing unit 111, the storage unit 112, and an interface unit 113, and these units are connected to each other by a bus (not shown). The processing unit 111 executes a program stored in the storage unit 112. The processing unit 111 is, for example, a CPU. The storage unit 112 is, for example, a RAM, ROM, or hard disk. The interface unit 113 is interposed between the processing unit 111 and external devices (the host computer 42, the driving units 121 and 141, the detection units 122 and 142, and an operation unit 44) and is, for example, a communication interface or an I/O interface. The host computer 42 is a control apparatus that manages and controls the overall production facility (work system S) where the operation apparatus system 1 is installed. The operation unit 44 constitutes an interface for operating the operation apparatus 10 by the operator and is, for example, a teach pendant or an operation panel. The operation unit 44 may also be, for example, a personal computer or the like connected to the control apparatus 11 via the interface unit.

The processing unit 111 obtains information of a driving parameter value of the driving unit. In the embodiment, the processing unit 111 obtains present driving current values ri1 and ri2 of the motors of the driving units 121 and 141 as information of driving parameter values of the driving units 121 and 141. The processing unit 111 obtains information of detection values rp1 and rp2 of the detection units. In the embodiment, the processing unit 111 obtains pulse values detected by the encoders of the detection units 122 and 142. The obtained information of the present driving current values ri1 and ri2 serving as the driving parameter values of the driving units 121 and 141 and the information of the detection values rp1 and rp2 serving as the pulse values of the detection units 122 and 142 are obtained by a present information obtaining unit R4 (driving information obtaining unit R4) of the processing unit 111. The present information obtaining unit R4 is obtained in, for example, a temporary storage area such as the cache memory of the processing unit 111. The present information obtaining unit R4 updates and obtains at a predetermined timing (including real time) the obtained present driving current values ri1 and ri2 of the motors and pulse values detected by the encoders of the detection units 122 and 142.

The storage unit 112 stores various data in addition to the program to be executed by the processing unit 111. The storage unit 112 includes, as storage areas for storing data, a determination unit 112a, a calibration information registration unit 112b, and an operation position setting information registration unit 112c, which respectively store determination parameter information M4a, calibration information M4b, and operation position setting information M4c.

The determination parameter information M4a is information for determining the position (for example, vertical position or horizontal position) of the moving body side at the time of calibration. In the embodiment, the identification support member 4a includes "shaft information", "determination angle information", "current lower limit value information", and "current upper limit value information". In the following description, when the longitudinal directions E1 and E2 of the upper arm 14 and forearm 16 are a vertical direction, their positions will be sometimes called vertical positions. When the longitudinal directions E1 and E2 are a horizontal direction, the positions of the upper arm 14 and forearm 16 will be sometimes called horizontal positions.

The "shaft information" is information unique to the pivot shaft. In the embodiment, shaft information J1 and shaft information J2 about two pivot shafts are set. The shaft information J1 is shaft information (information of the first pivot shaft) of the pivot shaft member 146 of the upper arm 14, and the shaft information J2 is shaft information (information of the second pivot shaft) of the pivot shaft member 166 of the forearm 16.

The "determination angle information" is information of angles set in correspondence with a plurality of reference positions set in the alignment mechanism, and is set in accordance with shaft information. In the embodiment, the two alignment mechanisms 20 and 22 are provided, and the two pieces of shaft information J1 and J2 are set for the respective alignment mechanisms 20 and 22.

In the embodiment, for the shaft information J1 included in the first alignment mechanism 20, the vertical position (0° at which a line connecting the shaft center of the pivot shaft member 166 and the tip 164 is positioned parallel to a vertical line when the angle of the upper arm 14 to the vertical direction is 0°) of the posture of the forearm 16 is defined as a reference posture used when performing determination of the shaft information J1, and 0° corresponding to the vertical position and 90° corresponding to the horizontal position are set. In the embodiment, the processing unit 111 determines which of the vertical position (angle of the upper arm 14 to the vertical direction is 0°) and the horizontal position (angle of the upper arm 14 to the vertical direction is 90°) is the posture of the upper arm 14 at the time of calibration.

In the embodiment, for the shaft information J2 included in the second alignment mechanism 22, the vertical position (angle of the upper arm 14 to the vertical direction is 0°) of the posture of the upper arm 14 is defined as a reference posture used when performing determination of the shaft information J2, and 0° corresponding to the vertical position, 90° corresponding to the horizontal position, and 45° are set. In the embodiment, the processing unit 111 determines which of the vertical position (angle of the forearm 16 to the vertical direction is) 0° and the horizontal position (angle of the forearm 16 to the vertical direction is) 90° is the posture of the upper arm 14 at the time of calibration, or whether the angle of the forearm 16 is the position of 45° to the vertical direction.

In the embodiment, the number of pieces of determination angle information set for each of the pieces of shaft information J1 and J2 is two for the shaft information J1 and three for the shaft information J2, but is not limited to this. For example, two or three pieces of determination angle information may be set for each shaft information, or another number of pieces of determination angle information may be set. "±" sign information may be further added so that which of the first to fourth quadrants is the quadrant of information can be identified from a combination of the angle and the sign.

The "current lower limit value information" and "current upper limit value information" are pieces of information used as thresholds for setting a determination range when determining the posture of the moving body, and are pieces of information of unique determination parameter values (determination current values) set in advance for each determination angle information. That is, range values of the determination current value are set by the current lower limit value information and the current upper limit value information. The position of the moving body side is determined by comparing these pieces of information and the present current value information of the driving parameter value of the driving unit obtained in the present information obtaining unit R4 of the processing unit 111.

In the embodiment, the operation apparatus 10 includes two moving bodies, that is, the upper arm 14 and the forearm 16. For the upper arm 14, two pieces of determination angle information are set as two different determination postures. For the forearm 16, three pieces of determination angle information are set as three different determination postures. To determine the postures of the respective moving bodies, "current lower limit value information" and "current upper limit value information" are set in advance for each determination angle information.

As the "current lower limit value information" and "current upper limit value information" set in the embodiment as pieces of information for determining the posture of the moving body unit, the determination unit 112a stores current lower limit value information serving as the lower limit value of a tolerance value based on a reference current value, and current upper limit value information serving as the upper limit value of the tolerance value based on the reference current value. However, for example, a reference current value (absolute value) may be set, and the tolerance value may be stored as information for determination in the determination unit 112a.

In the case of the alignment mechanism 20 according to the embodiment, the driving parameter value of the driving unit 121 is the present driving current value of the motor, and this value is proportional to a torque applied to the pivot shaft member 146. The torque applied to the pivot shaft member 146 is small when the upper arm 14 is at the vertical position, and large when the upper arm 14 is at the horizontal position. From this relationship, range values of a determination current value set for the vertical position and range values of a determination current value set for the horizontal position are set in the determination unit 112a so as to include a minimum value of the determination current value and a maximum value of the determination current value, respectively. When a present driving current value ri falls within the range of range values including the minimum value of the determination current value, it is determined that the moving body unit 13 is in the vertical posture. When the present driving current value ri falls within the range of range values including the maximum value of the determination current value, it is determined that the moving body unit 13 is in the horizontal posture.

In the embodiment, determination angle information set for the shaft information J1 takes two, 0° and 90° with respect to the vertical direction, so the position of the upper arm 14 selected when executing calibration is either the vertical position or the horizontal position. As the difference in torque generated on the pivot shaft at each position increases, the difference in driving parameter value increases, and the position of the upper arm 14 can be easily determined based on an obtained driving parameter value.

When determination angle information including even angles of 0° and 90° not set in practice is adopted, "±" sign information is further added and set. One side is set as the + side based on the minimum value of the determination current value, the other side is set as the − side, and 0° on the + side and 0° on the − side can be determined. Further, one side is set as the + side based on the maximum value of the determination current value, the other side is set as the − side, and 90° on the + side and 90° on the − side can be determined.

The calibration information M4b is information for registering detection value information of the detection unit and reference position information of the moving body unit. The calibration information M4b includes "shaft information", "set value angle information", and "set angle value detection value information". In the embodiment, calibration information is set for each of the two detection units 122 and 142.

The "set angle value information" is information of the angle of a pivot portion corresponding to a determined position, and is set as reference position information of the detection unit. In the embodiment, a value of "determination angle information" determined by the determination parameter information M4a is set. The "set angle value detection value information" is detection value information by the detection unit at a reference position. In the embodiment, the processing unit 111 stores information of the angle of the moving body side determined as a reference position and information of a pulse value detected by the encoder at a reference position (set angle value information), in the calibration information registration unit 112b in association with each other. In the embodiment, "set angle value information" and "set angle value detection value information" are set and registered for each of the two detection units 122 and 142.

The operation position setting information M4c is information for managing a work position when the operation apparatus 10 works. The operation position setting information M4c includes "operation position information", "J1 operation position angle information", and "J2 operation position angle information". The operation apparatus 10 is activated by executing a program stored in the storage unit 112 by the processing unit 111. At this time, the operation apparatus 10 performs predetermined work at each position set in the operation position setting information M4c.

The "operation position information" is information for identifying a position regarding a position where the operation apparatus 10 performs work (in the embodiment, attachment work of attaching the part P) on a work (product W). A piece or pieces of operation position information can be set in the operation position setting information registration unit 112c in accordance with work. The J1 operation position angle information and J2 operation position angle information are angle information of the shaft information J1 and angle information of the shaft information J2 at a set operation position, and are set for each operation position information. In the embodiment, pieces of J1 operation position angle information and pieces of J2 operation position angle information are set.

<Calibration Method>

Figure 5:
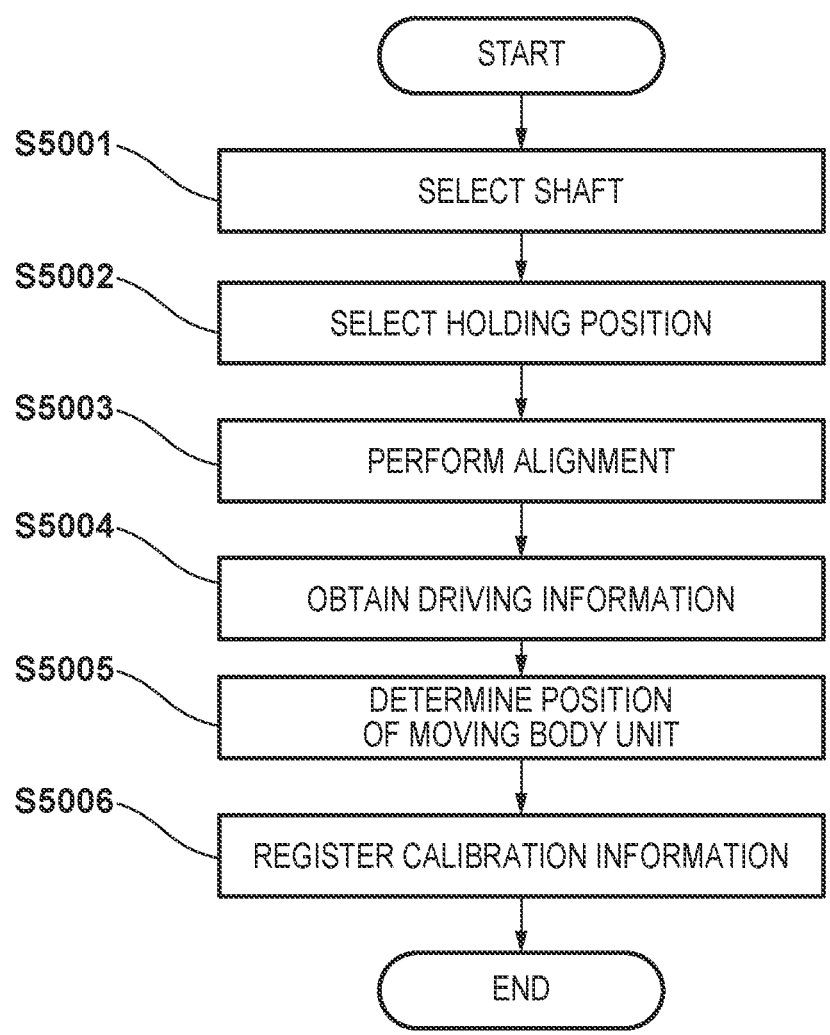
FIG. 5 is a flowchart showing processing of a processing unit at the time of executing calibration.

Next, a calibration method for the detection unit of the operation apparatus 10 including the moving body unit 13 including a plurality of moving bodies will be described. FIG. 5 is a flowchart showing processing of the processing unit 111 at the time of executing calibration. This processing starts when the operator presses a calibration start button provided on a teach pendant serving as the operation unit 44. In the following description, calibration of the detection unit 142 of the forearm 16 is performed in a posture in which the operation apparatus 10 and an upper obstacle do not interfere, as shown in FIG. 3B.

In step S5001, the processing unit 111 selects the second pivot shaft corresponding to the pivot shaft member 166 axially supporting the forearm 16 as a pivot shaft subjected to calibration. In the embodiment, the operator manipulates the teach pendant to input information (select the moving body unit) of a moving body included in the moving body unit 13 subjected to calibration. The processing unit 111 executes processing for selecting the pivot shaft of the moving body based on the input information (selection information). In the embodiment, the operator selects the second pivot shaft serving as a calibration target shaft and inputs the information, and the processing unit 111 recognizes and decides, as the calibration target shaft, the second pivot shaft that operates the forearm 16.

In step S5002, the processing unit 111 moves, out of a plurality of moving bodies included in the moving body unit 13, moving bodies not selected as the calibration target shaft, to a position specified in advance, aligns them to corresponding reference holes, and holds the posture of the moving body unit (holds the moving body unit).

In the embodiment, the operator manipulates the teach pendant to instruct the processing unit 111 about the first pivot shaft not selected as the calibration target shaft. Then, the processing unit 111 operates the upper arm 14, controls driving of the driving unit 121, moves the upper arm 14 to the reference hole 201 serving as the specified position, and performs alignment. Note that an arrangement can also be employed in which in alignment to the specified position (holding position), the operator selects a specified value (selects holding position) from a plurality of specified positions (holding positions) set in advance. An arrangement can also be employed in which the processing unit 111 automatically moves the upper arm 14 based on an instruction by input of selection of a specified position by the operator, and aligns the upper arm 14 to the specified position. Further, the processing unit 111 may align, to the specified position, the upper arm 14 of the first pivot shaft not subjected to calibration and then restrict the pivot of the upper arm 14. For example, it is also possible that the processing unit 111 moves, to the specified position, the upper arm 14 of the first pivot shaft not selected as the calibration target and after alignment, does not pivot the upper arm 14 even if input of a pivot manipulation to the upper arm 14 by the operator is accepted. This arrangement restricts the operation so as not to drive the upper arm 14 of the first pivot shaft not selected as the calibration target during execution of calibration. As a result, a calibration operation on the second pivot shaft selected for calibration can be executed without any influence of the upper arm 14 of the first pivot shaft.

In step S5003, the processing unit 111 aligns the forearm 16 of the second pivot shaft selected as the calibration target shaft. In the embodiment, the processing unit 111 controls driving of the driving unit 141 based on an input from the operation unit 44 by the operator. At this time, for example, the operator manipulates the teach pendant to pivot the forearm 16, align the reference hole 222 and the positioning hole 225, insert the positioning member 226 into these holes, and check the aligned position.

In step S5004, the processing unit 111 obtains driving information of the driving unit 141 that drives the forearm 16 of the second pivot shaft subjected to calibration. For example, when the processing unit 111 accepts an information registration command from the operator, it obtains (checks) the present driving current value ri2 serving as the driving parameter value of the driving unit 141 that drives the forearm 16 of the second pivot shaft selected in step S5001. For example, when the operator presses a registration button provided on the operation unit 44, the processing unit 111 accepts the information registration command.

In step S5005, the processing unit 111 determines the position of the forearm 16 of the second pivot shaft selected in step S5001. For example, the processing unit 111 automatically determines the calibration position of the actually aligned forearm 16 by comparing the driving parameter value (present current value information ri2 of the present information obtaining unit R4) of the driving unit 141 obtained in step S5004 with range information falling within a range including current lower limit value information and current upper limit value information set for the shaft information J2 (second pivot shaft) in the determination parameter information M4a.

In the embodiment, the shaft information J2 is set as shaft information about the forearm 16. Since the positioning hole 225 is aligned to the reference hole 222 serving as the calibration position of the forearm 16, the forearm 16 is set at the horizontal position (horizontal posture). Since the forearm 16 is set at the horizontal position, the current value of the motor of the driving unit 141 becomes a numerical value larger than 0. The processing unit 111 determines that the determination angle information of the shaft information J2 of the determination parameter information M4a is "90"° and the calibration position of the forearm 16 is 90°. Note that it is defined that during the calibration work of the forearm 16, the position of the upper arm 14 is the vertical position where the positioning hole 205 is aligned to the reference hole 201.

In step S5006, the processing unit 111 performs processing for registering calibration information. For example, the processing unit 111 registers, in the calibration information registration unit 112b in correspondence with the shaft information J2 of the calibration information M4b, the angle of the forearm 16 to the upper arm 14 as set angle value information, and the obtained detection value of the detection unit 142 as set angle value detection value information.

The angle of the forearm 16 determined in step S5005 is the angle of the forearm 16 to the vertical direction. Since the upper arm 14 is at the vertical position in this description, the angle determined in step S5005 coincides with the angle of the forearm 16 to the upper arm 14. In this case, the processing unit 111 registers the information of the angle determined in step S5005 as the set angle value information, and registers "90"° in the set angle value information of the shaft information J2 of the calibration information 4b. The processing for registering the set angle value information of the calibration information is completed.

Figure 6A:
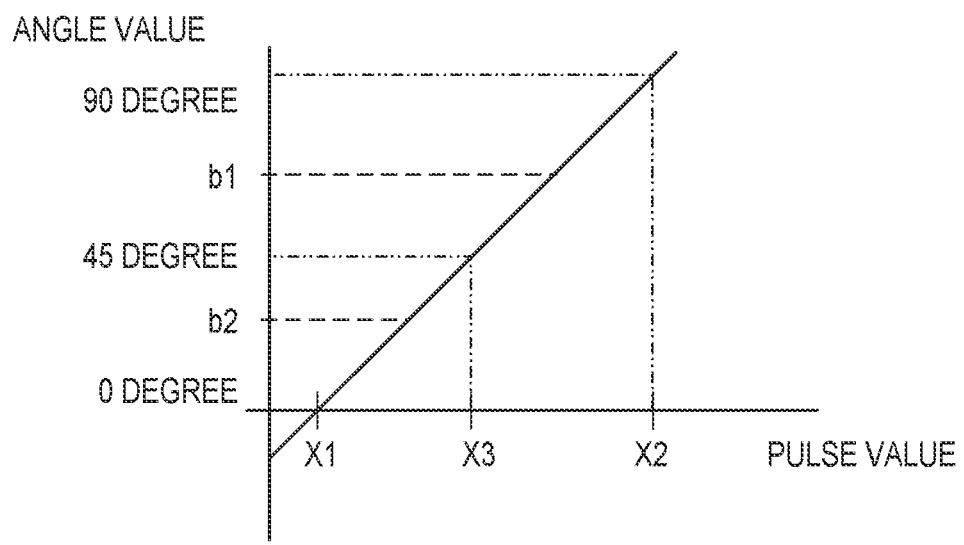
FIG. 6A is a graph showing the characteristic of the pivot angle of a moving body unit with respect to the detection value of a detection unit before replacement.
Figure 6B:
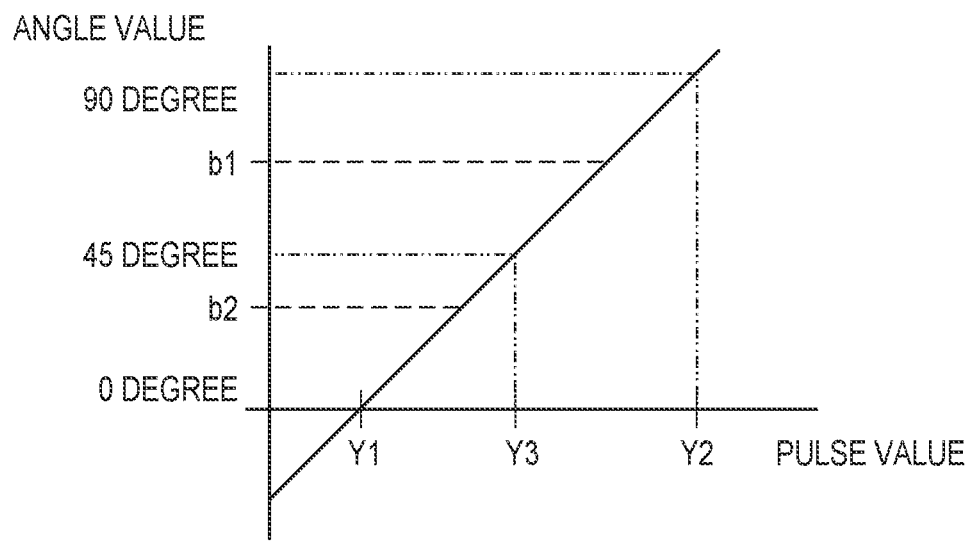
FIG. 6B is a graph showing the characteristic of the pivot angle of the moving body unit with respect to the detection value of the detection unit after replacement.

FIGS. 6A and 6B are graphs each showing the characteristic of the detection value of the detection unit and the pivot angle value. FIG. 6A shows, for example, the characteristic of the detection unit 142 of the forearm 16. In FIG. 6A, the abscissa represents the detection value (pulse value in the embodiment) of the detection unit 142, and the ordinate represents the pivot angle value of the detection unit 142. In the embodiment, the pulse value and the pivot angle value are proportional, and the constant of proportionality (slope) is a value determined by the specifications of the detection unit (encoder in the embodiment). Since a reference position and a pulse value at the reference position are set by the above-described calibration method, one point on a straight line representing these characteristics is specified.

The posture (position of the tip) of the moving body unit 13 in the operation apparatus 10 is set as J1 operation position angle information and J2 operation position angle information for each operation position information of the operation position setting information M4c. The value of set angle information set in calibration information serves as a reference angle, and respective operation positions are derived from the reference angle. For internal processing of control, a detection value (pulse value) is employed.

The processing unit 111 can control the posture of the moving body unit 13 based on the characteristics of the detection values of the detection units 122 and 142, and the pivot angles of the detection units 122 and 142 included in the moving body unit 13 with respect to the detection values.

FIG. 6B is a graph showing the characteristic of the detection unit 142 after replacing the encoder serving as the detection unit 142. In the operation apparatus 10, the driving units 121 and 141, the detection units 122 and 142, and the like are sometimes replaced owing to wear of a component or the like. When the detection units 122 and 142 are replaced, calibration of the detection units 122 and 142 needs to be executed again. In the embodiment, the slope of the characteristic of the pivot angle value with respect to the pulse value is determined by the specifications of the encoder. As long as encoders have the same specifications, the slope of the characteristic does not change before and after replacement. A pivot angle value set by the above-described calibration method serves as a reference position, and a pulse value at the pivot angle value is set as a pulse value at the reference position. As a result, pulse values in the entire pivot range are obtained.

Especially when the detection unit of the operation apparatus 10 installed as part of the work system S needs to be replaced and the detection unit is replaced, the set value angle information of the calibration information M4b of the encoder is adjusted in accordance with the angle of a moving body in which the encoder has been replaced. Hence, no operation position information need be set again. As internal processing of control, a detection value set as set value angle information is set as set angle value detection value information, and the characteristic of the pulse value in operation position information is calculated and internally set. For example, when calibration is performed in the posture in FIG. 3B before and after replacing the detection unit 142, a value registered as the pulse value is X2 before replacement and Y2 after replacement, and the pivot angle value is 90° before and after replacement. As shown in FIG. 4, the operation position setting information M4c is set to pieces of angle information b1 and b2 for respective operation positions of the forearm 16 included in the moving body unit 13, and does not depend on the detection value of the detection unit 142. Even if the detection unit 142 is replaced, no operation position setting information need be set again and the operation apparatus 10 can work at a predetermined position, increasing the efficiency of the setting work.

As described above, according to the embodiment, a posture having undergone calibration can be automatically determined and stored as calibration information. Even if a registration error of position information by the operator occurs, calibration information in a correct calibration posture can be registered, avoiding a human error. Since a posture when executing calibration can be selected from a plurality of postures, calibration can be executed in a posture avoiding contact with a surrounding obstacle.

Other Embodiments

According to the above-described embodiment, in the determination parameter information M4a, one current lower limit value information and one current upper limit value information are set for one determination angle information with respect to a moving body unit subjected to calibration after a moving body unit not subjected to calibration is set at a predetermined position (posture) in the operation apparatus 10 (vertical articulated robot) constituted by series-connecting two moving body units. Alternatively, a plurality of postures may be set at the time of calibration of a moving body unit not subjected to calibration, and pieces of current lower limit value information and pieces of current upper limit value information may be set for pieces of determination angle information corresponding to respective set angles.

FIG. 7 shows determination parameter information according to another embodiment. For example, in determination parameter information M7a, pieces of current lower limit value information and pieces of current upper limit value information are set for respective pieces of holding position information of the second moving body unit when determination angle information is 0° for shaft information J1 of the first moving body unit. In the embodiment, the first moving body unit corresponds to an upper arm 14, and the second moving body unit is a forearm 16.

In shaft information J1 of the upper arm 14, 0° and 90° are set as determination angle information, and 0° and 90° of the forearm 16 are set as holding positions of another moving body unit. In determination angle information about the shaft information J1 of the upper arm 14, pieces of holding position information "0°" and "90°" of the forearm 16 are set for 0° of the upper arm 14. A total of four pieces of determination angle information are set for the shaft information J1.

When the upper arm 14 is at the vertical position and the forearm 16 is at the horizontal position (positions in FIG. 3B), a torque generated on the pivot shaft member 146 becomes larger than a torque when the upper arm 14 and the forearm 16 are at the vertical positions (positions in FIG. 3A). In the embodiment, the driving current value of the motor serving as the driving parameter value of a driving unit 121 is proportional to the torque generated on the pivot shaft member 146. That is, an obtained value of the driving parameter value of the driving unit 121 by a processing unit 111 changes in accordance with the posture of the forearm 16 even if the posture of the upper arm 14 remains unchanged. If pieces of current lower limit value information and pieces of current upper limit value information are held in accordance with positions of the forearm 16, the position of the upper arm 14 can be determined more accurately.

In the embodiment, when determining the position of the upper arm 14, the processing unit 111 obtains the driving parameter value (present current information of a present information obtaining unit R4) of the driving unit 121 in step S5003 of FIG. 5. Then, the processing unit 111 automatically determines the position of the forearm 16 by specifying a range including the obtained value out of the ranges of four pieces of current lower limit value information and four pieces of current upper limit value information set for the shaft information J1 of the determination parameter information M7a. For example, when the position of the forearm 16 is at the horizontal position (90°) shown in FIG. 3B in determining the position of the upper arm 14, the processing unit 111 determines the driving parameter value as a value falling within a range set by current lower limit value information a1' and current upper limit value information (a1'+α1'). With this arrangement, a calibration posture can be flexibly set and determined for a surrounding obstacle environment, and the posture of a moving body unit subjected to calibration can be accurately determined.

Figure 9B:
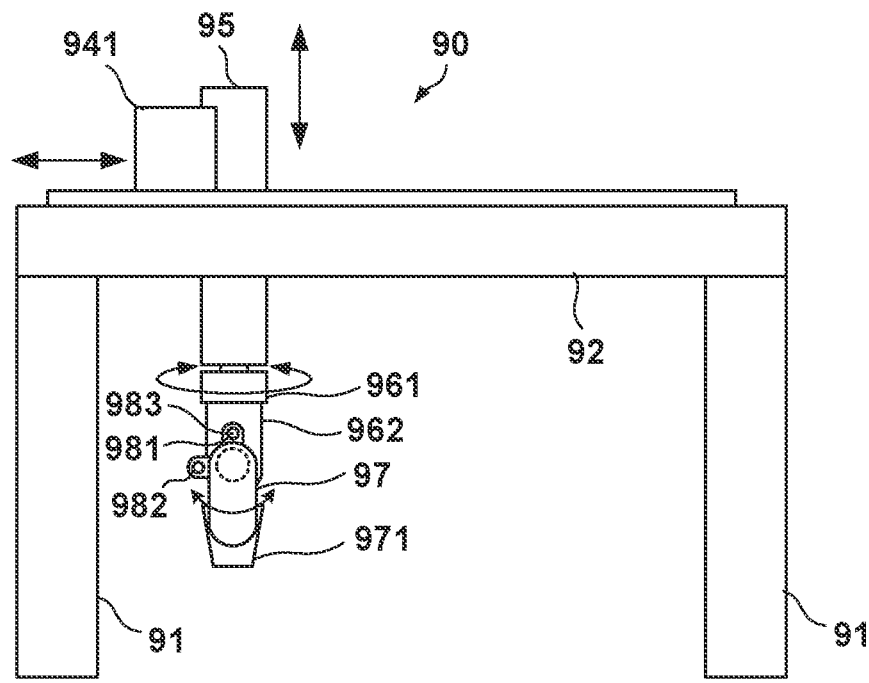
FIG. 9B is a view (schematic view) from the direction of an arrow A in FIG. 9A.

An operation apparatus system according to still another embodiment will be described. Note that a description of the same arrangement as that in the above-described embodiment will not be repeated. FIG. 9A is a view schematically showing an operation apparatus 90 according to the embodiment. FIG. 9B is a view (schematic view) from the direction of an arrow A in FIG. 9A. The embodiment is different from the above-described embodiment in that the operation apparatus includes one moving body unit and the base is provided movably.

The operation apparatus 90 is constituted by frames 91, and a horizontal moving unit that is supported by the frames 91 and can move a horizontal moving elevator 95 (to be described later) in the first horizontal direction. The horizontal moving unit includes a pair of traveling guides 92, and a traveling body 94 supported movably on the pair of traveling guides 92. The traveling body 94 includes a driving unit 941 that can travel on one of the paired traveling guides 92, and a traveling main body 942 that is provided between the paired traveling guides 92 and can is driven by the driving unit 941 to move on the traveling guides 92. A moving direction of the traveling body 94 in the first horizontal direction will be sometimes called a traveling direction. The driving unit 941 can adopt, for example, a numerically controllable servo motor.

The operation apparatus 90 includes the horizontal moving elevator 95 that is supported by the traveling main body 942 and can move along the traveling main body 942. The horizontal moving elevator 95 can move in a direction (direction perpendicular to the traveling direction) along the traveling main body 942, and also in the vertical direction. These movements are performed by, for example, a driving source such as a motor (not shown).

Further, the operation apparatus 90 includes a base 96 supported at the lower portion of the horizontal moving elevator 95, and a moving body unit 97 pivotally supported by the base 96. The base 96 includes a turn portion 961 that is supported at the lower portion of the horizontal moving elevator 95 so that the turn portion 961 can turn, and a base main body 962 supported at the lower portion of the turn portion 961. The turn portion 961 can turn the base main body 962 around a vertical axis. The turn portion 961 is turned by, for example, a motor (not shown). The moving body unit 97 is pivotally supported by the base main body 962. The moving body unit 97 can pivot by, for example, a structure similar to the upper arm 14 according to the above-described embodiment. A tip 971 is provided at an end of the moving body unit 97 opposite to an end on a side on which the moving body unit 97 is supported by the base main body 962. Various tip tools can be attached to the tip 971.

With this arrangement, the moving body unit 97 of the operation apparatus 90 can move in the traveling direction, a direction perpendicular to the traveling direction, and the vertical direction, can turn around the vertical axis, and can pivot around the horizontal axis.

The operation apparatus 90 includes an alignment mechanism 98. The alignment mechanism 98 includes reference holes 981 and 982 provided on the moving body unit 97 side, and a positioning hole 983 provided on the base 96 side. When performing alignment, the operator manipulates the moving body unit 97 to pivot and align it so that either the reference hole 981 or 982 overlaps the positioning hole 983. Then, the alignment of the pivot angle of the moving body unit 97 with respect to the base 96 is checked.

The operation apparatus 90 employed in the operation apparatus system according to still another embodiment includes the horizontal moving unit and the horizontal moving elevator 95. When performing calibration of the moving body unit 97, calibration work can be executed at an optimum position while a surrounding obstacle environment is avoided.

Figure 9C:
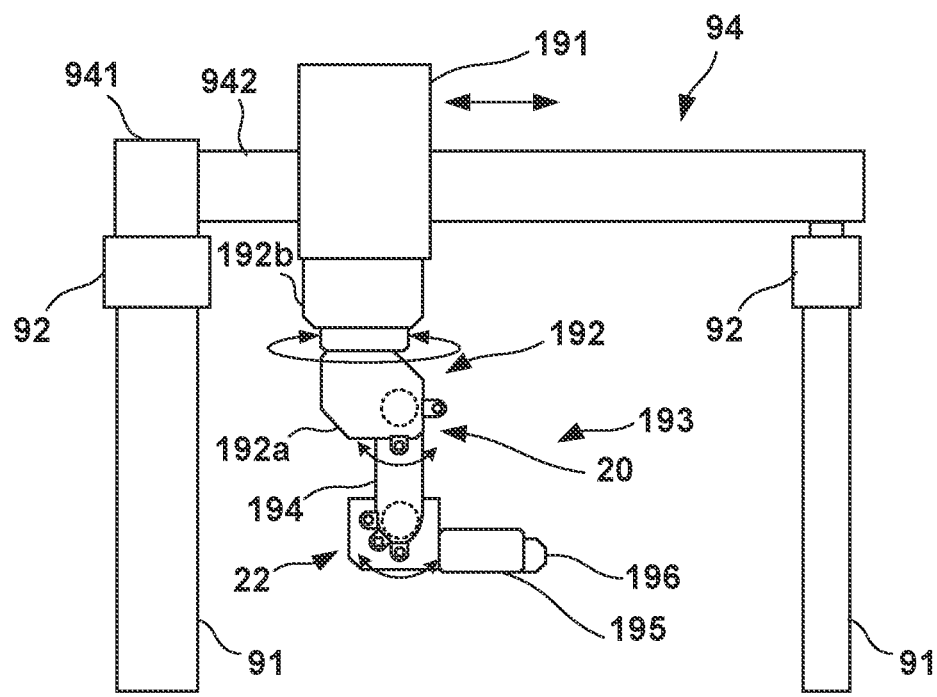
FIG. 9C is a view showing a modification of the operation apparatus shown in FIGS. 9A and 9B.

FIG. 9C is a schematic view showing a modification of the operation apparatus shown in FIGS. 9A and 9B. FIG. 9C is a view showing a state viewed from a B direction in FIG. 9A. The modification in FIG. 9C is different in that a moving body unit 193 includes a horizontal moving unit described in the above-mentioned embodiment. Also, the modification is different in that a horizontal moving portion 191 capable of moving in a direction perpendicular to the traveling direction is movably supported by a traveling main body 942. The horizontal moving portion 191 moves in a direction perpendicular to the traveling direction by a motor or the like. The moving body unit 193 is constituted at the lower portion of the horizontal moving portion 191. In this modification, the moving body unit 193 is constituted by pivotally supporting a base main body 192b fixed to the lower portion of the horizontal moving portion 191, a base turn portion 192a that can turn about an axis extending in a direction perpendicular to the base main body 192b, and similar to the embodiment, an upper arm 194 having one end axially supported by the base turn portion 192a and the other end that moves on a circumferential track about an axially supported shaft, and an forearm 195 having one end axially supported by the other end of the upper arm 194 and the other end that moves on a circumferential track about an axially supported shaft.

A position of a tip 196 in the vertical direction can be adjusted by a combination of the pivot operations of these components. An arrangement of moving a base 192 in the vertical direction can be omitted, unlike the horizontal moving elevator 95 in the embodiment shown in FIGS. 9A and 9B. However, an arrangement capable of elevating the horizontal moving portion 191 may also be adopted. Since this modification employs the alignment mechanisms 20 and 22 described in the above-mentioned embodiment, the alignment of the pivot angle of the moving body unit 193 can be checked by these mechanisms.

This modification adopts the horizontal moving portion 191 in addition to the horizontal moving unit, similar to still another embodiment. When performing calibration of the moving body unit 193, calibration work can be executed at an optimum position while a surrounding obstacle environment is avoided.

Preferred embodiments of the present invention have been described above. The invention is not limited to the foregoing embodiments, and various variations/changes are possible within the spirit of the invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A calibration method for an operation apparatus including a first moving body unit capable of pivoting about a horizontally extending axis, wherein the first moving body unit includes one end that is axially supported to be pivotal and the other end that is provided at a distance from the one end and moves on a circumferential track about a pivot shaft of the first moving body unit, a first motor configured to drive the first moving body unit, and a first unit detector configured to detect a pivot position of the first moving body unit, the calibration method including:

aligning the first moving body unit to one reference position selected from a plurality of predetermined reference positions;

determining the selected reference position by comparing a driving parameter value of the first motor at the one reference position with determination parameter values respectively preset for the plurality of reference positions; and registering, as reference position information for calculating the pivot position, (i) position information of the selected reference position determined in the determining and (ii) detection value information regarding the pivot position detected by the first detector, wherein the detected driving parameter value is a present driving current value of the first motor, the determination parameter value which is preset is a fixed determination current value, and in the determining, when a present driving current value detected at the reference position aligned in the aligning is included in predetermined range values including a minimum value set as the determination current value, the first moving body unit is determined to take a vertical posture, and when a present driving current value that is detected at the reference position aligned in the aligning and is different from the present driving current value is included in predetermined range values including a maximum value set as the determination current value, the first moving body unit is determined to take a horizontal posture.

2. The calibration method for the operation apparatus according to claim 1, wherein the operation apparatus is a robot and further includes a stationary base, and the first moving body unit is an upper arm of a vertical articulated robot connected to the base.

3. The calibration method for the operation apparatus according to claim 1, wherein the operation apparatus is a robot and further includes an upper arm of a vertical articulated robot, and the first moving body unit is a forearm of the vertical articulated robot connected to the upper arm.

4. The calibration method for the operation apparatus according to claim 1, wherein the plurality of reference positions are a horizontal position at which the one end and the other end are lined horizontally, and a vertical position at which the one end and the other end are lined vertically.

5. A calibration method for an operation apparatus including a first moving body unit capable of pivoting about a horizontally extending axis, a first motor configured to drive the first moving body unit, and a first detector configured to detect a pivot position of the first moving body unit, the calibration method including:

aligning the first moving body unit to one reference position selected from a plurality of predetermined reference positions;

determining the reference position by comparing a driving parameter value of the first motor at the one reference position with determination parameter values respectively preset for the plurality of reference positions; and registering, as reference position information for calculating the pivot position, position information of the one reference position determined in the determining and detection value information of the first detector, wherein the operation apparatus further includes a second moving body unit capable of pivoting about a horizontally extending second axis, wherein the second moving body unit includes one end that is axially supported to be pivotal and the other end that is provided at a distance from the one end and moves on a circumferential track about a pivot shaft of the second moving body unit, a second motor configured to drive the second moving body unit, and a second detector configured to detect a pivot position of the second moving body unit, and the calibration method further includes:

selecting the first moving body unit as a moving body subjected to calibration; and holding the second moving body unit at a holding position predetermined as the pivot position of the second moving body unit, wherein the second moving body unit has a plurality of holding positions in advance, and the calibration method further includes selecting a holding position from the plurality of holding positions of the second moving body unit, and moving the second moving body unit to the selected holding position, and in the determining for the first moving body unit, the reference position is determined from a determination current value set in accordance with the holding position of the second moving body unit selected in the selecting the holding position.

6. An operation apparatus system comprising an operation apparatus and a control apparatus for the operation apparatus, the operation apparatus comprising:

a first moving body unit capable of pivoting about a horizontally extending axis wherein the first moving body unit includes one end that is axially supported to be pivotal and the other end that is provided at a distance from the one end and moves on a circumferential track about a pivot shaft of the first moving body unit;

a first motor configured to drive the first moving body unit;

a first detector configured to detect a pivot position of the first moving body unit; and a plurality of reference positions predetermined as positions each serving as a reference of the first moving body unit, and the control apparatus comprising:

a memory storing a program; and one or more processors which, by executing the program, function as:

an alignment unit configured to align the first moving body unit to one reference position selected from the plurality of predetermined reference positions;

a determination unit configured to determine the one reference position based on determination parameter values preset for the plurality of reference positions and a driving parameter value of the first motor; and a registration unit configured to register, as reference position information for calculating the pivot position, position information of the one reference position determined by the determination unit and detection value information of the first detector, wherein the driving parameter value of the first motor is a current value of the first motor, the detected driving parameter value is a present driving current value of the first motor, the determination parameter value which is preset is a unique determination current value, the determination parameter value includes a first determination current value IaO and a second determination current value IbO different from the determination current value IaO, predetermined first range values including the first determination current value IaO and predetermined second range values including the second determination current value IbO are registered in the determination unit, if the present driving current value is included in the predetermined first range values, the determination unit determines a first posture, and if the present driving current value is included in the predetermined second range values, determines a second posture.

7. The operation apparatus system according to claim 6, wherein the control apparatus, by executing the program, further functions as:

a driving information obtaining unit configured to obtain information of the driving parameter value;

a determination unit configured to register information of the determination parameter value; and a calibration information registration unit configured to register detection value information of the determined reference position and position information based on the detection value information.

8. The operation apparatus system according to claim 6, wherein the operation apparatus is a robot, the robot further includes a pivotal second moving body unit, wherein the second moving body unit includes one end that is axially supported to be pivotal and the other end that is provided at a distance from the one end and moves on a circumferential track about a pivot shaft of the second moving body unit, a second motor configured to drive the second moving body unit, and a second detector configured to detect a pivot position of the second moving body unit, and the control apparatus, by executing the program, further functions as moving body unit selection unit configured to select a moving body unit from a plurality of moving body units subjected to calibration.

9. The operation apparatus system according to claim 8, wherein the first moving body unit comprises first one end that is axially supported to be pivotal, and a first other end that is provided at a distance from the first one end and moves on a first circumferential track about a pivot shaft of the first moving body unit, the second moving body unit comprises second one end that is axially supported to be pivotal by the first other end, and a second other end that is provided at a distance from the second one end and moves on a second circumferential track about a pivot shaft of the second moving body unit, and the driving parameter value of the second motor is a current value of the second motor.

10. The operation apparatus system according to claim 9, wherein the control apparatus, by executing the program, further functions as setting unit configured to set at least one piece of operation position information, and the at least one piece of operation position information is angle information of the first moving body unit and the second moving body unit.

11. The operation apparatus system according to claim 6, wherein the first moving body unit comprises one end that is axially supported to be pivotal, and the other end that is provided at a distance from the one end and moves on a circumferential track about a pivot shaft of the first moving body unit.

12. The operation apparatus system according to claim 6, wherein a detection value of the first detector is a pulse value corresponding to a pivot angle of the first moving body unit.

13. A control apparatus that controls an operation apparatus including:

a first moving body unit capable of pivoting about a horizontally extending axis, wherein the first moving body unit includes one end that is axially supported to be pivotal and the other end that is provided at a distance from the one end and moves on a circumferential track about a pivot shaft of the first moving body unit;

a first motor configured to drive the first moving body unit; and a first detector configured to detect a pivot position of the first moving body unit, the control apparatus comprising:

one or more processors configured to function as:

an alignment unit configured to align the first moving body unit to one reference position selected from the plurality of predetermined reference positions;

a determination unit configured to determine the one reference position based on determination parameter values preset for the respective reference positions of the first moving body unit and a driving parameter value of the first motor at the one reference position;

a registration unit configured to register, as reference position information for calculating the pivot position, position information of the one reference position determined by the determination unit and detection value information of the first detector, a driving information obtaining unit configured to obtain information of the driving parameter value;

a determination unit configured to register information of the determination parameter value; and a calibration information registration unit configured to register detection value information of the determined one reference position and position information based on the detection value information, wherein the detected driving parameter value is a present driving current value of the first motor, the determination parameter value which is preset is a unique determination current value, the determination parameter value includes a first determination current value IaO and a second determination current value IbO different from the determination current value IaO, predetermined first range values including the first determination current value IaO and predetermined second range values including the second determination current value IbO are registered in the determination unit, and if the present driving current value is included in the predetermined first range values, the determination unit determines a first posture, and if the present driving current value is included in the predetermined second range values, determines a second posture.

14. The control apparatus according to claim 13, wherein the predetermined first range values are set to include a minimum value, the predetermined second range values are set to include a maximum value of the present driving current value, and if a detected present driving current value Ia at the one reference position aligned by the alignment unit is determined to fall within a range of the first range values including 0, the determination unit determines that the first moving body unit takes a vertical posture, and if a present driving current value Ib different from the detected present driving current value Ia at the reference position aligned in the alignment unit is determined to fall within a range of the second range values including the maximum value, determines that the first moving body unit takes a horizontal posture.

* * * * *

UNITED STATES PATENT AND TRADEMARK OFFICE
CERTIFICATE OF CORRECTION

| | |
|---|---|
| PATENT NO. | : 11,433,543 B2 |
| APPLICATION NO. | : 17/078209 |
| DATED | : September 6, 2022 |
| INVENTOR(S) | : Kazutaka Toyoda and Yutaro Maruno |

It is certified that error appears in the above-identified patent and that said Letters Patent is hereby corrected as shown below:

In the Specification

Column 10, Line 13:
"is) 0°"
Should read:
-- is 0°) --

Column 10, Line 14:
"is) 90°"
Should read:
-- is 90°) --

In the Claims

Column 18, Line 30 Claim 1:
"and a first unit detector"
Should read:
-- and a first detector --

Signed and Sealed this
Thirty-first Day of January, 2023

Katherine Kelly Vidal
*Director of the United States Patent and Trademark Office*